United States Patent [19]

ap Rhys

[11] 4,093,951
[45] June 6, 1978

[54] COMPENSATION FOR SIMULTANEOUS PLATFORM MOTION AND ANTENNA SCANNING IN MTI RADARS

[75] Inventor: Tomos L. ap Rhys, Ellicott City, Md.

[73] Assignee: The United States of America as represented by the Secretary of the Navy, Washington, D.C.

[21] Appl. No.: 797,207

[22] Filed: May 16, 1977

[51] Int. Cl.² ............................................. G01S 9/42
[52] U.S. Cl. .................................................... 343/7.7
[58] Field of Search ........................ 343/7.7, 9, 5 ST

[56] References Cited

U.S. PATENT DOCUMENTS

| | | | |
|---|---|---|---|
| 3,735,399 | 5/1973 | Sletten et al. | 343/7.7 |
| 3,735,400 | 5/1973 | Sletten et al. | 343/7.7 |
| 3,786,509 | 1/1974 | Applebaum et al. | 343/7.7 X |
| 3,806,924 | 4/1974 | Applebaum | 343/7.7 |
| 3,877,011 | 4/1975 | Holberg et al. | 343/7.7 |
| 3,879,729 | 4/1975 | Nevin | 343/7.7 X |
| 3,882,498 | 5/1975 | McGuffin | 343/7.7 X |
| 3,968,490 | 7/1976 | Gostin | 343/7.7 |

Primary Examiner—Malcolm F. Hubler
Attorney, Agent, or Firm—R. S. Sciascia; Philip Schneider; William C. Daubenspeck

[57] ABSTRACT

The effects of simultaneous platform motion and antenna scanning are compensated for in radar systems of the moving-target-indicator type. Signals from auxiliary sub-arrays of the antenna compensate signals from main sub-arrays of the antenna for the effects of antenna scanning. Delayed, scanning-compensated signals from the main sub-arrays are then combined with undelayed, uncompensated signals from the main sub-arrays to provide signals that are compensated for the effects of scanning motion and platform motion. A first embodiment provides a clutter canceller having motion compensation at each stage of cancellation. A second embodiment provides a large number (N) of motion-compensated signals which are synchronized in time and phase for further MTI processing.

6 Claims, 17 Drawing Figures

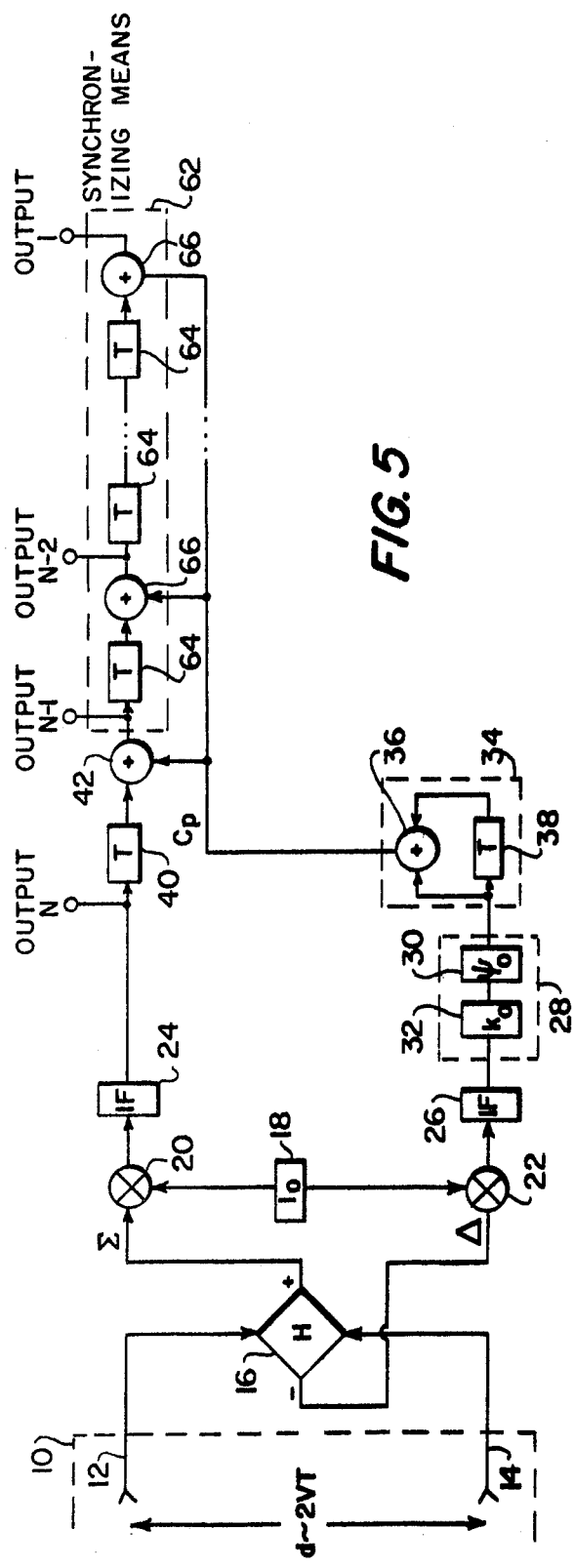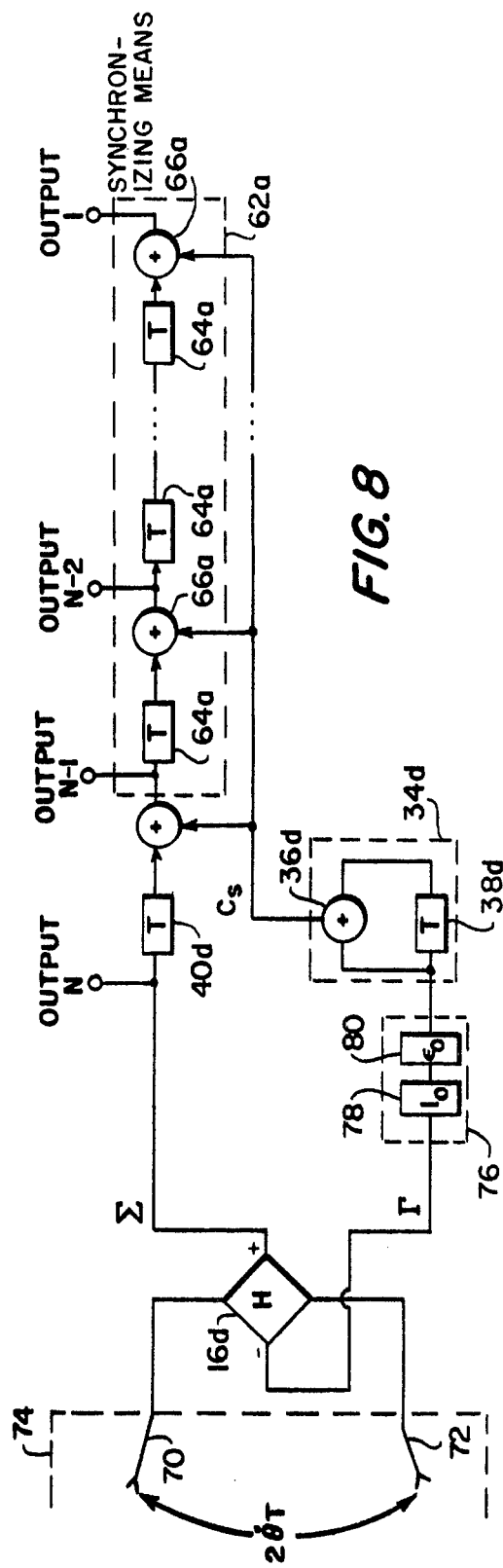
FIG.5
FIG.8

FIG. 6
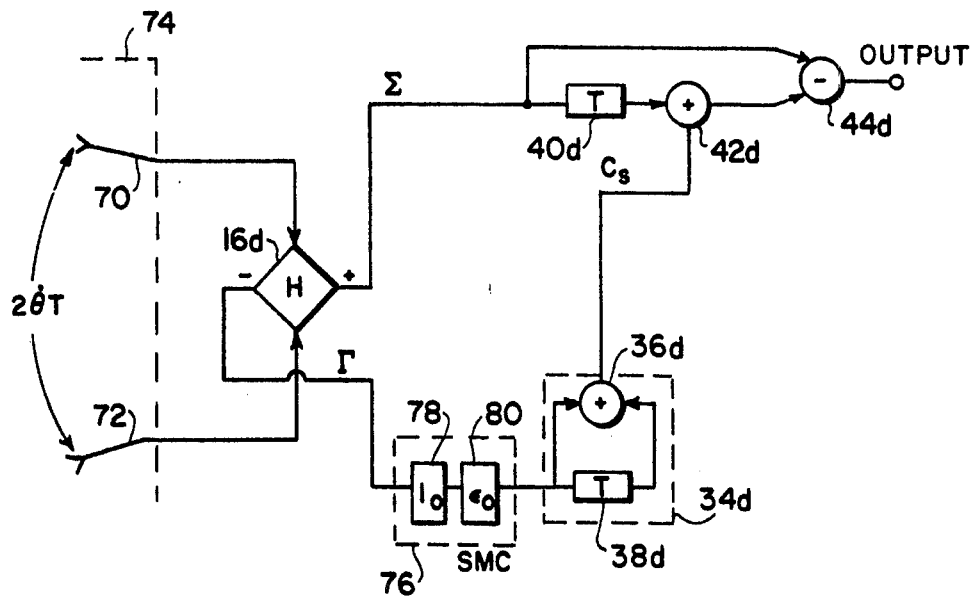
$$OA = \Sigma_t(\theta+\dot{\theta}T)\Sigma_r(\theta+\dot{\theta}T)$$
$$OB = \Sigma_t(\theta)\Sigma_r(\theta)$$
$$BC = |\Sigma_t(\theta)\Gamma(\theta)$$
$$CD = |\Sigma(\theta+\dot{\theta}T)\Gamma(\theta+\dot{\theta}T)$$
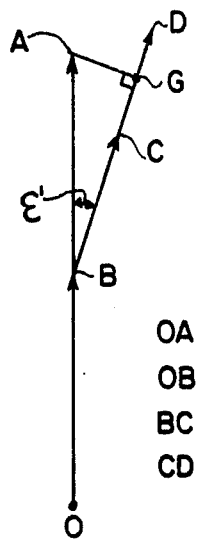
FIG. 7

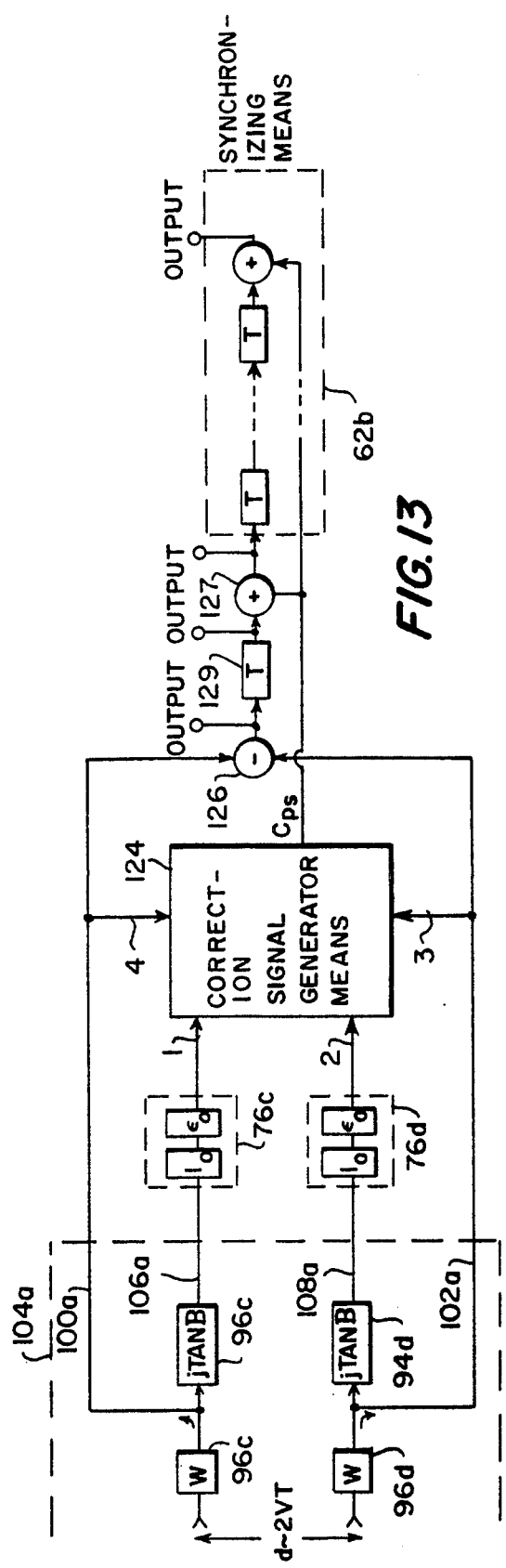
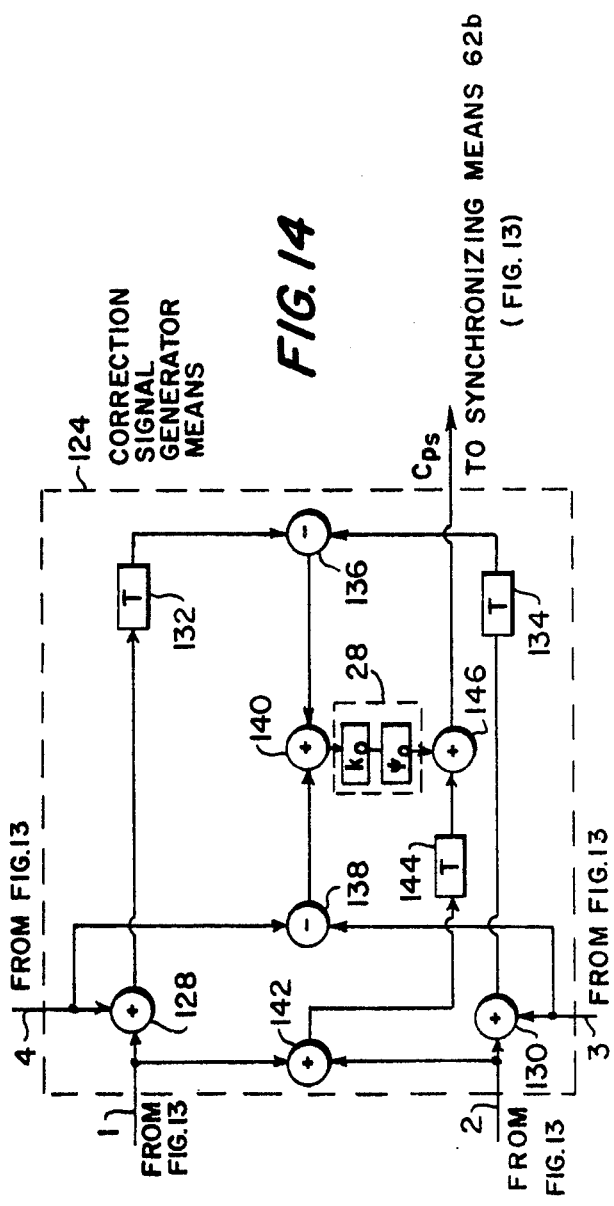

COMPENSATION FOR SIMULTANEOUS PLATFORM MOTION AND ANTENNA SCANNING IN MTI RADARS

BACKGROUND OF THE INVENTION

This invention relates generally to radar systems of the moving-target-indicator type and, more particularly, to arrangements which compensate for the effects of simultaneous platform motion and antenna scanning in such radar systems.

A coherent moving-target-indicator (MTI) radar system uses the doppler characteristic present in the backscattered radar pulse to distinguish between the returns from moving targets and those from stationary objects or clutter. In a stationary system, the spectral content of a received signal due to clutter is essentially the same as that of the transmitted pulse and only the spectral content of a received signal due to a moving target has a Doppler shift. However, in an airborne moving target indicator (AMTI) system, the clutter sources move relative to the radar platform so that the signals originating from them exhibit a Doppler shift. Consequently, both the clutter spectra and the moving target exhibit a Doppler shift in frequency as a function of platform velocity. In addition, the MTI detection problem is also complicated by the scanning motion of the radar antenna. The antenna rotation causes the received signals to experience an amplitude modulation because the signal gain changes as the antenna beam moves relative to the positions of the scatterers.

As is well known, platform-motion effects may be compensated by physically or electronically displacing the antenna's phase center along the plane of its aperture. A first pulse is transmitted and received with the antenna having its phase center at a location P1. A second pulse is transmitted and received with the antenna having its phase center at a location P2. With exact compensation, these phase centers P1 and P2 will be separated by an amount equal to the distance moved by the aircraft during this interpulse period, and so P1 and P2 coincide in space. Then, the signal received in the first channel from any stationary object energized by the first pulse will be identical to the signal received in the second channel on the second pulse. Commonly, it is desirable to leave the transmit antenna fixed with respect to the aircraft and separate the received antennas by twice the distance the aircraft moves in an interpulse period to obtain the same result to a close approximation. With this accomplished, two sets of return signals are available, almost identical with the pair which would be received if the platform were stationary. Techniques based on this principle are known as DPCA-Displaced Phase Center Antenna.

In one implementation of the DPCA technique, as described in Chapter 18 of "Radar Handbook," M. I. Skolnik (Editor), McGraw Hill, 1970, the signal returns are first formed into a sum channel and a difference channel. In first-order terms, if the difference pattern is in quadrature with the sum pattern and is proportional to the sum pattern multiplied by tan $\eta$, where $2\eta$ is the pulse-to-pulse phase advance as seen by the radar receiver due to the platform motion, the difference channel may be used to compensate the sum channel for the effects of the platform motion. The two channels are combined in a hybrid amplifier which produces the sum and difference of the two channels. The clutter is then cancelled by subtracting the sum output of the amplifier, delayed by a time interval equal to the period between radiated pulses, from the difference output of the amplifier.

A similar technique, also described in "Radar Handbook," supra, is used to compensate the sum channel for the effects of the antenna rotation. A difference channel that is in phase with the sum channel and is proportional to the derivative of the sum channel is combined with the sum channel in a hybrid amplifier. The clutter may then be cancelled by subtracting the sum output of the amplifier, delayed by a time interval equal to the period between radiated pulses, from the difference output of the amplifier.

Modern systems often call for higher-order processing such as N-pulse coherent integration where, for example, N can be equal to 16. The prior-art motion compensation, as incorporated in the conventional MTI canceller, restricts the system design because the pulses are compensated for motion two at a time and the effects of the motion reappear between pairs. When processing is to be carried out coherently over a large number of pulses, it is advantageous to compensate for motion over this same group of pulses. In principle, these new MTI techniques, such as coherent integration, do not depend on the use of a pre-canceller (i.e., clutter cancellation as the first stage of MTI processing). Consequently, in addition, it is advantageous to compensate for motion in a manner that does rely on the presence of a pre-canceller.

The prior art techniques are also unsatisfactory when it is desired to compensate for simultaneous platform motion and antenna scanning. Prior systems normally compensate for the type of motion that is of the greater consequence in the particular application, but do not compensate for the other. In general, it is not possible simply to combine the above prior art techniques when both types of motion are present because the two types of compensations interact.

SUMMARY OF THE INVENTION

The present invention provides arrangements for compensating the backscattered signals for the effects of simultaneous platform and scanning motion so that the backscattered signals from a stationary object are synchronized in time and phase. The motion compensation is not limited to two pulses at a time, but may be applied to the number of pulses that is required for the particular MTI processing system. In canceller arrangements, the motion compensation may be applied at each stage of cancellation. The invention also incorporates phase and amplitude adjustments which minimize the effects of antenna constructional errors on the antenna patterns, or alternatively, lead to a relaxation of the antenna constructional tolerances.

In the present invention, the antenna has main sub-arrays that provide similarly-shaped receive beams having phase centers which are separated by approximately $2VT$ (where V is the velocity component in the aperture plane and T is the interpulse period). An auxiliary sub-array is formed for each main sub-array having the same reciving elements as the main sub-array but with modified weighting so that the two beams (from the main sub-array and the corresponding auxiliary sub-array) have boresight directions which are separated by $2\theta T$ (where $\theta$ is the angular velocity of the antenna) and have lines of center which intersect at the antenna.

In one embodiment of the present invention having two main and two auxiliary sub-arrays, the signals from each auxiliary sub-array, after adjustment in phase and amplitude, are added to the signals from the corresponding main sub-array to form two compensated signals. These two compensated signals, after being delayed for an interpulse period, are fed to a first hybrid amplifier which forms the sum and difference of its inputs. The signals from the main sub-arrays are also fed directly to second hybrid amplifier which forms the sum and difference of its two inputs. The difference outputs from the two hybrid amplifiers are summed, and after adjustment in phase and amplitude, are added to the sum output of the first hybrid amplifier. The resulting signal is synchronized in phase and time with the sum output of the second hybrid amplifier, and the two signals may be subtracted to cancel clutter.

A second embodiment of the present invention uses the main sub-array signals and the corresponding auxiliary sub-array signals to generate a correction signal that may be added to a delayed sum signal formed from the two main sub-array signals to provide a first synchronized signal that is synchronized in time and phase with an undelayed sum signal formed from the main sub-array signals (i.e., the most recent sum signal). A second synchronized signal may be formed by delaying the first synchronized signal and summing it with the correction signal. A series of synchronized signals may be formed by repeating the process.

Other advantages and novel features of the invention will become apparent from the following detailed description of the invention when considered in conjunction with the accompanying drawings wherein:

BRIEF DESCRIPTION OF THE DRAWINGS

FIG. 5 is a block diagram of a system which provides compensation for platform motion over a large number of pulses;

FIG. 6 is a block-diagram of a two-pulse canceller with scanning-motion compensation;

FIG. 7 is a phasor diagram of the system of FIG. 6 illustrating the effects of phase errors in the difference-channel signals;

FIG. 8 is a block diagram of a system which provides compensation for antenna scanning over a large number of pulses;

FIG. 13 and FIG. 14 are block diagrams of an embodiment of the present invention which provides compensation for simultaneous platform motion and antenna scanning over a large number of pulses.

DESCRIPTION OF THE PREFERRED EMBODIMENT

Figure 1:
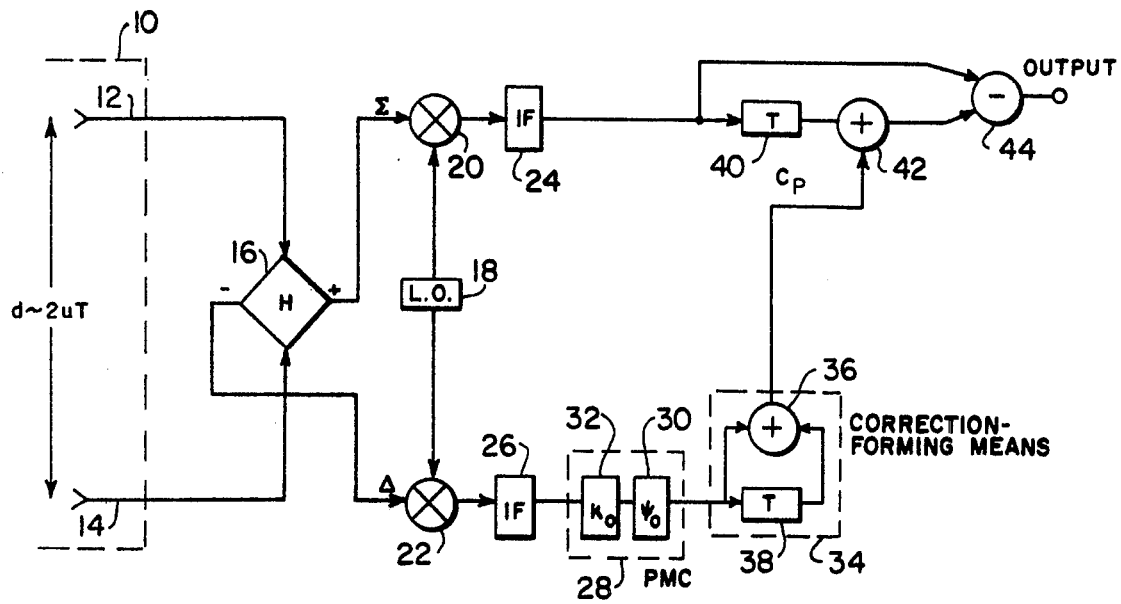
FIG. 1 is a block diagram of a two pulse canceller with platform-motion compensation.

Referring now to the drawings, wherein like reference characters designate like or corresponding parts throughout the several views and, more particularly to FIG. 1, a system having platform-motion compensation in accordance with the present invention includes antenna 10 for radiating and receiving electromagnetic energy in the form of a series of pulsed RF signals. Two sub-arrays 12 and 14 of the antenna 10 are formed to provide similarly-shaped receive beams that overlap in the horizontal plane, their phase centers being separated by a distance "$d$" and their boresight directions being parallel. This distance $d$ is chosen to be a little less than the maximum expected value of $2VT$, where V is the component of platform velocity in the aperture plane and T is the interpulse period. The sum and difference of these two sub-arrays are taken in hybrid amplifier 16 to form the sum ($\Sigma$) and difference ($\Delta$) channels of the prior art.

In the prior art, the energy entering the system through the sidelobes is treated as insignificant; on the other hand, the energy entering the system through the mainlobes is compensated for platform motion. This sharp distinction is avoided in the present invention, emphasis being placed on the overall performance. As in the prior art, the sum-channel signals are treated as the main signals and the difference-channel signals are treated as auxiliary signals that are used to compensate the sum-channel signals for the effects of platform motion. To a first approximation, neglecting the effects of constructional errors, antenna 10 is characterized by difference-channel signals in quadrature with the sum-channel signals and proportional to the sum-channel signals multiplied by tan $\eta$ where $2\eta$ is the pulse-to-pulse phase-advance as seen by the radar due to platform motion.

The RF signals in the sum-channel $\Sigma$ and the difference channel $\Delta$ are mixed with the output of local oscillator 18 in mixers 20 and 22 to form IF signals which are amplified in amplifying stages 24 and 26.

The signals in the difference channel $\Delta$ are sent to a platform-motion-compensation (PMC) optimization means 28 that includes a phase adjuster 30 and an amplitude adjuster 32 that introduce corrections to the signals. As will be described hereinafter, PMC optimization means 28 adjusts the difference-channel signals for phase and amplitude deviations from the designed values and adjusts the amplitude by a factor proportional to the backscatter's relative velocity orthogonal to the antenna's boresight.

The output of PMC optimization means 28 is connected to a correction-forming means 34 which includes an addition circuit 36 and a delay circuit 38. The difference-channel signals are sent from PMC optimization means 28 directly to the addition circuit 36 and also to the delay circuit 38, which subjects the signals to a delay equal to the period between successive radiated pulses (also referred to herein as an interpulse period, T). The delayed signal is fed to the addition circuit 36 which adds the delayed signal and the next undelayed signal to form a correction signal $C_p$ in the difference channel.

The series of IF signals in the sum channel $\Sigma$ are fed to a delay circuit 40, which subjects an input signal to a delay equal to the interpulse period. The delayed sum-channel signal from delay circuit 40 is then combined with the correction signal $C_p$ from the difference channel Δ in an addition circuit 42. The output of addition circuit 42 is a delayed, compensated sum-channel signal which is synchronized in time and phase with the undelayed sum-channel signal from IF amplifier 24. Clutter may be cancelled by subtracting the undelayed sum-channel signal and the delayed, compensated sum-channel signal at subtraction circuit 44.

Figure 2:
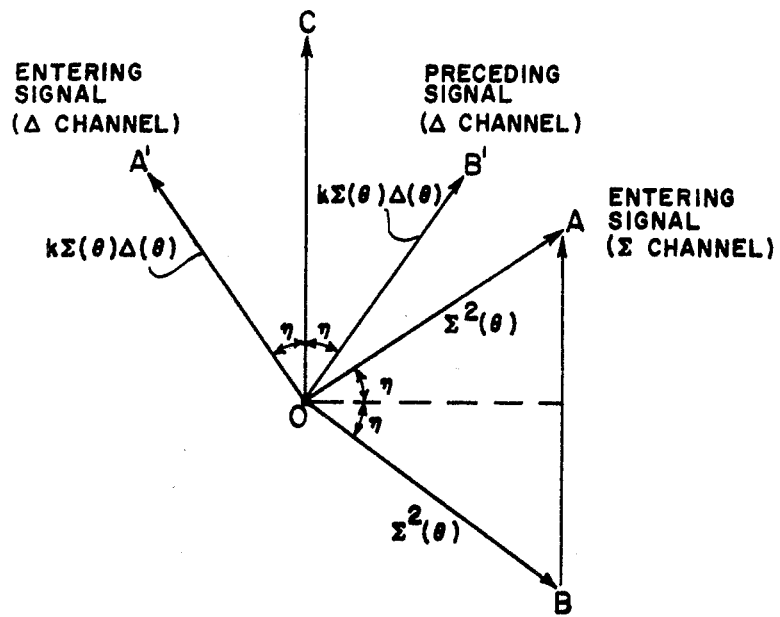
FIG. 2 is a phasor diagram illustrating the platform motion compensation technique of the present invention.

The concept which is the basis of platform motion compensation of the present invention may be better understood with reference to the phasor diagram of FIG. 2. For one particular elemental backscatter, successive signals in the sum-channel Σ are represented by phasors OB and OA respectively, and differ in phase with respect to each other by angle $2\eta$ due to the motion of the platform. For simplicity, phasors OA and OB are shown so that angle $2\eta$ is bisected by the horizontal axis of the diagram. The entering signal (i.e., the signal now being received) and preceding signal OA' and OB', respectively, in the difference channel Δ from the same backscatterer are each nominally in quadrature with the corresponding sum-channel signal and differ in phase with respect to each other by angle $2\eta$. The object of the compensation is to bring the preceding signal, OB, in the sum-channel from the back-scatterer into phase and time synchronization with the entering signal, OA, in the sum-channel from the same backscatterer so that the two signals may be cancelled.

Assuming for simplification that the transmit pattern $\Sigma_t(\theta)$ is identical with the receive sum pattern $\Sigma_r(\theta)$ so that the return in the sum-channel is proportional to $\Sigma^2(\theta)$ and the return in the difference channel is proportional to $\Sigma(\theta)\Delta(\theta)$, the platform motion compensation is accomplished, ignoring the effects of errors for clarity of exposition, as follows:

The entering and preceding signals (OA' and OB') in the difference channel are added to form a correction signal OC which is then added to the preceding signal OB in the sum-channel to bring signal OB into sychronism with the entering signal OA in the sum-channel. Specifically the signal OA' entering the system in the difference channel is adjusted in amplitude by a scale-factor $k$ proportional to the scatterer's relative velocity orthogonally to the antenna boresight so that the length of phasor OA' is $k\Sigma(\theta)\Delta(\theta)$. This entering adjusted difference-channel signal is added to the preceding adjusted difference-channel signal OB', of length $k\Sigma(\theta)\Delta(\theta)$ to form a correction phasor OC of approximate length $2k\Sigma(\theta)\Delta(\theta)\cos\eta$ in a direction along the vertical axis. (Phasor OC represents the output of correction-forming means 34 in FIG. 1.) From the geometry of FIG. 2, it can be seen that a phasor AB of length $2\Sigma^2(\theta)\sin\eta$ in a direction along the vertical axis may be added to phasor OB to bring the latter phasor into synchronism with phasor OA. If phasor OC equals phasor AB then phasor OC may be used in place of AB to provide this synchronism. This condition will occur if $$|OC| = |AB|$$

$$2k\Sigma(\theta)\Delta(\theta)\cos\eta = 2\Sigma^2(\theta)\sin\eta$$

$$\Delta(\theta) = \frac{1}{k}\Sigma(\theta)\tan\eta$$

Since, by design, the difference pattern $\Delta(\theta)$ does have the foregoing relationship to the sum pattern $\Sigma(\theta)$, the correction phasor OC (correction signal $C_p$ in FIG. 1) may be added to phasor OB (the preceding sum-channel signal and the output of delay circuit 40 in FIG. 1.) to bring the latter into phase and time synchronization with phasor OA (the entering sum-channel signal). Since phasor OA is equivalent to phasor OB plus phasor OC, the signal from the backscatterer will be cancelled from the sum channel if they are subtracted (in unit 44 in FIG. 1). The signals from moving targets will not be cancelled in general because they will experience an additional phase shift due to the target's motion during the interpulse period.

As noted hereinbefore, the designed antenna patterns cannot be realized perfectly and random constructional errors may degrade system performance. The platform-motion-compensation optimization means 28 introduces phase and amplitude corrections to the difference-channel signal to optimize the motion compensation over the mainlobe. The PMC optimization means 28 may be better understood by reference to the phasor diagram of FIG. 3 which shows the system of FIG. 2 with phase and amplitude errors in the difference-channel signal. The entering and preceding signals in the difference channel, OA' and OB', respectively, are combined to form correction signal OC which is equal to BD and added to the preceding signal in the sum channel OB to bring it into phase synchronism with the entering sum-channel signal OA. As can be seen in the figure, if there are amplitude and phase errors in the system, the compensation is not exact, and a residual phasor AD is produced. Performance may be optimized by minimizing the total power associated with residual phasor AD over the mainlobe region. The power associated with phasor AD is given by $$P = K \int_{-\pi}^{\pi} |AD|^2 d\theta$$

where K is a constant determined by the impedance across which the output signal is developed.

Figure 3:
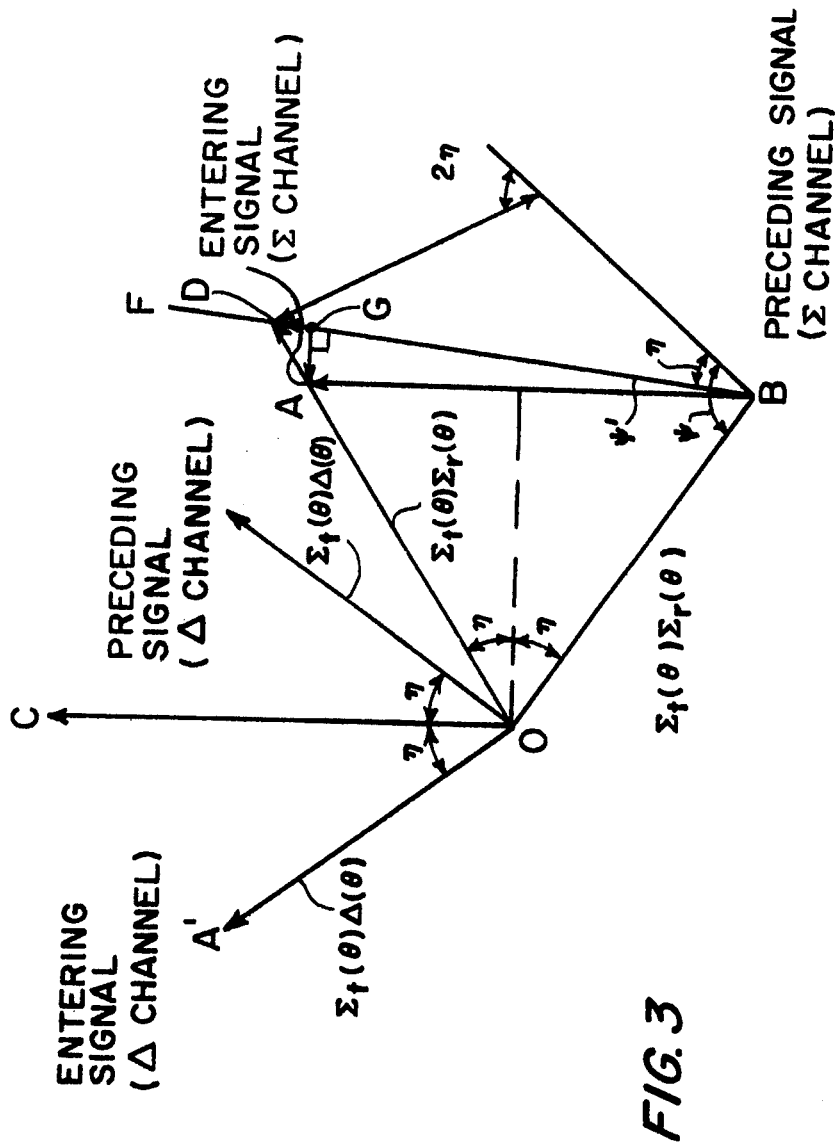
FIG. 3 is a phasor diagram illustrating the system of FIG. 1 with phase errors in the difference-channel signals.

In FIG. 3 the phase characteristic between the sum-channel signal OB and the difference-channel OB' is denoted by $\Psi$ and, in general, it differs from the desired value of $\pm \pi/2$ by some phase error $\Psi'$. Geometry shows that as the amplitude of the difference-channel signal is adjusted, point D moves along straight line BGF. Consequently, the residual power P is minimized when point D coincides with point G.

The optimal phase adjustment $\Psi_o$ in the phase characteristic $\Psi$ is then given by $$\psi_o = \frac{1}{2}\tan^{-1}\frac{\int_{-\pi}^{\pi}\Sigma_t^2(\theta)\Sigma_r^2(\theta)\sin^2\eta\sin2\psi d\theta}{\int_{-\pi}^{\pi}\Sigma_t^2(\theta)\Sigma_r^2(\theta)\sin^2\eta\cos2\psi d\theta}$$

and the optimal amplitude scale-factor $k_o$ is then $$k_o = \frac{1}{2}\frac{\int_{-\pi}^{\pi}\Sigma_t^2(\theta)\Sigma_r(\theta)\Delta(\theta)\sin2\eta\sin(\psi - \psi_o)d\theta}{\int_{-\pi}^{\pi}(\Sigma_r(\theta)\Delta(\theta))^2 d\theta}$$

It will be noted that the embodiment of FIG. 1 compensates the backscattered signals for the effects of platform motion in two-pulse groups and provides a single stage of cancellation. The system of FIG. 4 extends the platform-motion compensation technique of the present invention to the compensation of three-pulse groups to form a double canceller with double compensation of platform-motion. Three sub-arrays 52, 54 and 56 of antenna 50 are formed to provide similarly-shaped receiving beams that overlap in the horizontal plane, their phase centers being separated by a distance "d" and their boresight directions being parallel. This distance d is chosen in the same manner as it was chosen in the 2-pulse system of FIG. 1 (i.e., a little less than the maximum expected value of 2VT). The three sub-arrays 52, 54 and 56 are used two at a time in the same way as the two sub-arrays are used in the two-pulse system; that is, the sum and difference of sub-arrays 52 and 54 are taken in hybrid amplifier 16a to form a sum-channel $\Sigma$ and a difference channel $\Delta$, and the sum and difference of sub-arrays 54 and 56 are taken in hybrid amplifier 16b to form a sum channel $\Sigma_2$ and a difference channel $\Delta_2$. Signals in the $\Sigma_1$-channel are compensated for platform-motion by the signals in $\Delta_1$-channel and the clutter is cancelled as in the 2-pulse canceller of FIG. 1; likewise, signals in the $\Sigma_2$-channel are compensated for platform-motion by the signals in the $\Delta_2$-channel and the clutter cancelled. The two cancelled outputs are then applied to another 2-pulse canceller of the same configuration as that of FIG. 1 to provide the second stage of cancellation with compensation.

More specifically, the RF signals from sub-arrays 52, 54 and 56 are fed to the hybrid amplifiers to provide the required sum and difference-channel signals. These are then converted to IF signals by conventional mixing techniques (as shown in FIG. 1 but omitted from FIG. 4 for simplicity. The signals in each difference channel $\Delta_1$ and $\Delta_2$ are then sent to PMC optimization means 28a, 28b, which introduces corrections to the phase and amplitude as previously discussed in connection with PMC optimization means 28. The output of each PMC optimization means 28a, 28b, is sent to a correction-forming means 34a, 34b which functions in the same manner as the correction-forming means 34 of FIG. 1.

The IF signals in the sum channel $\Sigma_1(\Sigma_2)$ are fed to a delay circuit 40a (40b) and to a subtraction circuit 44a (44b). The output of the correction-forming means 34a (34b) and the output of the delay circuit 40a (40b) are combined in an addition circuit 42a (42b) and the output of the later is applied to the subtraction circuit 44a (44b). The output of the addition circuit 42a (42b) is a delayed sum-channel signal which has been compensated for platform motion and the output of the subtraction circuit 44a (44b) is a sum-channel signal in which the clutter has been cancelled.

The $\Sigma_1$-channel signal from subtraction circuit 44a and the $\Sigma_2$-channel signal from subtraction circuit 44b are applied as inputs to a two-pulse canceller as described in FIG. 1. Specifically, the sum and difference of the two signals are taken in hybrid amplifier 16c forming a sum-channel $\Sigma_3$ and a difference channel $\Delta_3$. The $\Delta_3$-channel signals are fed through a PMC optimization means 28c and a correction-forming means 34c. The $\Sigma_3$-channel signals are fed to a subtraction circuit 44c, and via a delay circuit 40c, to an addition circuit 42c where they are combined with the output of correction-forming means 34c. The output of addition circuit 42c is fed to the subtraction circuit 44c where the delayed, compensated $\Sigma_3$-channel signal is subtracted from an undelayed $\Sigma_3$-channel signal.

It should be apparent that the technique of the present invention can provide higher-order cancellers (with platform-motion compensation at each stage of cancellation) by adding additional sub-arrays, and cancelling in the manner of the two-pulse canceller of the present invention. The outputs of the two-pulse cancellers are then treated as input signals to a second group of two-pulse cancellers. Each two adjacent inputs are formed into sum and difference channels and cancelled. The process is repeated until a single compensated sum-channel signal is available at the system output.

Figure 4:
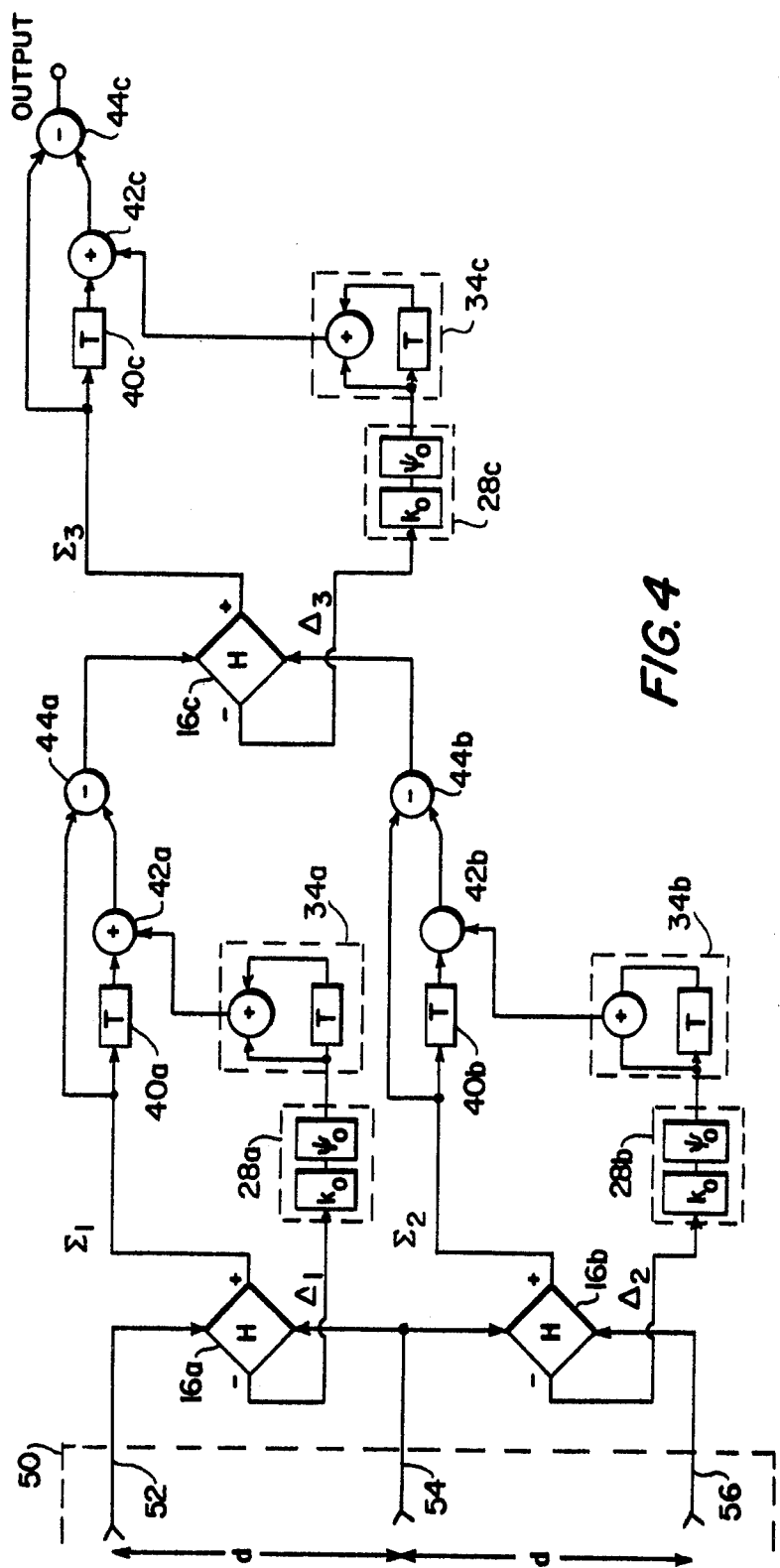
FIG. 4 is a block diagram of a three-pulse canceller with platform-motion compensation.

In principle optimal platform-motion compensation can be achieved in system where it is desired to compensate for motion over a large number (N) pulses by applying the foregoing technique. However, this may not be feasible because space limitations may cause an unacceptable penalty in antenna gain. Consequently, the two and three pulse systems of FIG. 1 and FIG. 4 are of the most practical significance. However, the system of FIG. 5 provides an alternative arrangement which uses only two sub-arrays and which is applicable to an N-pulse system.

Referring to FIG. 5, the system there shown is identical to the system of FIG. 1 up to and including addition circuit 42 where the correction signal $C_p$ is added to the delayed sum-channel signal to form a delayed compensated sum-channel signal. In this system, the delayed, compensated sum signal from addition circuit 42 is fed to a synchronizing means 62 which includes a series of delay circuits 64, each delay circuit subjecting an input signal to a delay equal to the period between successive radiated pulsed, and a series of addition circuits 66. Each addition circuit 66 has a first input connected to the output of one of the series of delay circuits 64, a second input connected to the output of addition circuit 36, and an output connected to the input of a following delay circuit 64.

Synchronizing means 62 functions in the following manner. The once-delayed, compensated sum-channel signal from addition circuit 42 is delayed by an interpulse period in the first of the series of delay circuits 64, and then fed the first of the series of addition circuits 66 where it is combined with the correction signal $C_p$ from the addition circuit 36 to form a twice-delayed, twice compensated sum-channel signal that is synchronized in time and phase with both the undelayed sum-channel signal from hybrid amplifier 16 and the once delayed, once compensated sum-channel signal from addition circuit 42. The twice delayed, twice compensated signal is in turn delayed and then combined with the correction signal $C_p$. The result is that a group of sum-channel signals that are synchronized in time and phase with the sum-channel signal from hybrid amplifier 16 is produced. Of course the number of synchronized signals available is determined by the number of delay circuits 64 and addition circuits 66 included in the synchronizing means 62.

These synchronized signals may now be used as inputs to MTI systems using techniques in which processing is conducted coherently over a large number of pulses, such as coherent integration. The synchronized signals may also be used as inputs to a clutter canceller. By subtracting each two consecutive signals, a group of signals in which clutter has been cancelled are formed. Each two consecutive signals in this resulting group may then be subtracted and the process repeated until there is only one output available.

Turning next to a system aimed at compensating for the effects of antenna scanning when there is no platform motion present. It should be noted that this is basically easier to achieve with accuracy because the antenna scanning is essentially constant, where as the quantity of significance in the case of the platform motion is the velocity component in the aperture plane and this varies over a wide range. The scanning-motion compensation may be accomplished by a technique analogous to the platform-motion technique previously described.

FIG. 6 shows a basic two-pulse canceller with compensation for the effects of antenna scanning according to the present invention. Two sub-arrays 70 and 72 of an antenna 74 are formed to provide similarly-shaped receive beams so phased as to point equally on either side, azimuthally, of the transmit antenna's boresight, with a total separation in azimuth angle of $2\theta T$ (where $\theta$ is the angular velocity of the antenna and T is the interpulse period) and the lines of center of the beams intersecting at the antenna. The sum and difference of these two are then formed in a hybrid amplifier 16d to provide main and auxiliary channels, denoted herein as $\Sigma$ and $\Gamma$, respectively. After the signals in both channels are converted to IF frequency by conventional mixing techniques (omitted from FIG. 6 for simplicity), the $\Gamma$-channel signals are fed to a scanning-motion compensation (SMC) optimization means 76 for introduction of a phase correction $\epsilon_o$ at 78 and an amplitude correction $l_o$ at 80. The functioning of the SMC optimization means 76 will be further described hereinafter in correction with FIG. 7.

A correction signal $C_s$ is formed in a manner identical with that employed for the platform-motion compensation. The $\Gamma$-channel signal from the optimization means 76 is fed to a correction-forming means 34d which includes an addition circuit 36d and a delay circuit 38d. A $\Gamma$-channel signal, delayed by an interpulse period in delay circuit 38d, is added to the next undelayed $\Gamma$-channel signal in addition circuit 36d to form the correction signal $C_s$.

The series of IF signals in the sum channel $\Sigma$ are fed to a delay circuit 40d which subjects input signals to a delay equal to the interpulse period. The delayed sum-channel signal from delay circuit 40d is then combined with the correction signal $C_s$ from the difference channel $\Gamma$ in an addition circuit 42d. The output of addition circuit 42d is a delayed, compensated sum-channel signal which is synchronized in time and phase with the undelayed sum-channel signal from hybrid amplifier 16d. Clutter may be cancelled by subtracting the undelayed sum-channel signal and the delayed compensated sum-channel signal at subtraction circuit 44d.

The phasor diagram for the scanning-motion compensation system of FIG. 6 with errors is shown in FIG. 7. Phasor OB of length $\Sigma_t(\theta)\Sigma_r(\theta)$ represents the preceding signal in the $\Sigma$ channel; phasor OA of length $\Sigma_t(\theta+\theta T)\Sigma_r(\theta+\theta T)$ represents the entering signal in the $\Sigma$- channel; and phasors BC, of length $l\Sigma_t(\theta)\Gamma(\theta)$, and CD of length $l\Sigma_t(\theta+\theta T)\Gamma(\theta+\theta T)$ represent the preceding and entering signals in the $\Gamma$ channel, respectively, where $l$ is a scale factor. Due to errors in antenna construction, the phase characteristic $\epsilon$ between the $\Sigma$-channel and the $\Gamma$ channel differs from the desired value of zero degrees by some phase error $\epsilon'$. Point G represents the point where the residual power due to incomplete cancellation is minimized. The optimal phase adjustment $\epsilon_o$ and amplitude adjustment $l_o$ in the $\Gamma$-channel signals to minimize the residual power are then given by:

$$\epsilon_o = \frac{1}{2} \tan^{-1} \left\{ \frac{\int_{-\pi}^{\pi} (\delta_1^2 \sin 2\epsilon) d\theta}{\int_{-\pi}^{\pi} (\delta_1^2 \cos 2\epsilon) d\theta} \right\}$$

where $\delta_1 = \Sigma_t(\theta + \theta T)\Sigma_r(\theta + \theta T) - \Sigma_t(\theta)\Sigma_r(\theta)$ $$l_o = \frac{\int_{-\pi}^{\pi} \delta_1 \delta_2 \cos(\epsilon - \epsilon_o) d\theta}{\int_{-\pi}^{\pi} \delta_2^2 d\theta}$$

where $\delta_2 = \Sigma_t(\theta + \theta T)\Gamma(\theta + \theta T) + \Sigma_t(\theta)\Gamma(\theta)$ There is little advantage to expanding the antenna-scanning compensation in canceller arrangements through the use of additional antenna sub-arrays in the manner of FIG. 4 because the first cancellation is generally effective. However, when a pre-canceller is not employed, multiple-pulse coherent processing techniques generally require antenna-scanning compensation over a large number of pulses. The system of FIG. 8 is suitable for use with such techniques because it provides a series of signals that have been compensated for antenna scanning so that they are synchronized in time and phase.

Referring to FIG. 8, the system there shown is identical to the system of FIG. 6 up to and including addition circuit 42d where the correction signal $C_s$ is added to the delayed sum-channel signal to form a delayed, compensated sum-channel signal. The delayed, compensated sum signal from addition circuit 42d is fed to a synchronizing means 62a which is identical to the synchronizing means 62 of FIG. 5. In this embodiment, the scanning correction signal Cs is added to each of the series in the $\Sigma$-channel (in the manner previously described in connection with correction signal $C_p$ in FIG. 5) to form a series of $\Sigma$-channel signals synchronized in time and phase with the $\Sigma$-channel signal from hybrid amplifier 16d. These synchronized signals may be used with coherent processing techniques or as inputs to clutter cancellers.

Figure 9:
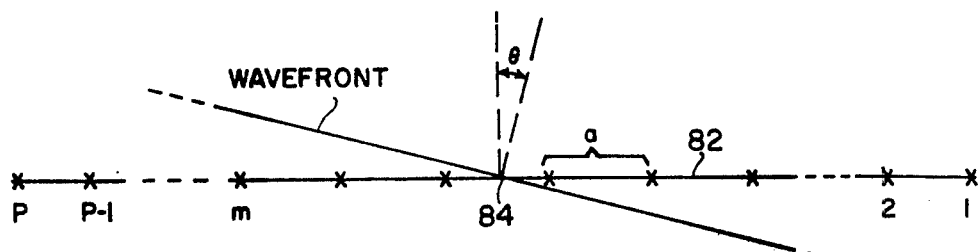
FIG. 9 schematically illustrates the element-to-element apparent phase shift due to antenna scanning.

In general, scanning-motion compensation must be supplied simultaneously with that for platform motion. If the platform-motion compensation is the primary function, then the sum channel has already been defined for the scanning-motion compensation. Consequently, the difference channel $\Gamma$ must be selected to provide compensation for a given sum channel. This may be accomplished in an array antenna by forming an auxiliary sub-array for each main sub-array (the main sub-arrays being those defined by the platform-motion compensation requirements) having the same receiving elements as the main sub-array but having modified weighting which will be explained in connection with FIGS. 9 and 10. FIG. 9 shows an array antenna 82 comprising P receiving elements with an interelement spacing of $a$. For an antenna having an even number of elements, the phase difference, $\beta m$, between the center of the array at 84 and the $m^{th}$ element for a scan angle of $\theta$ is $\beta m = 2\pi\lambda(m - P + 1/2) a \sin \theta$ and for an antenna having an odd number of receiving elements $$\beta_m = 2\pi/\lambda \, (m - P/2) \, a \sin \theta$$

In compensating for antenna scanning, the situation where the scan angle $\theta$ equals $\theta T$ is the case of interest. If a main sub-array is phased so that its peak response is in the boresight direction, two auxiliary sub-arrays may be formed, one pointing in the direction $+\theta$ and the other in the direction $-\theta$ by introducing a phase shift of $e^{+\alpha\beta m}$ or $e^{-\alpha\beta m}$, respectively, in each element (shown at 86 and 88 in FIG. 10a).

Figure 10A:
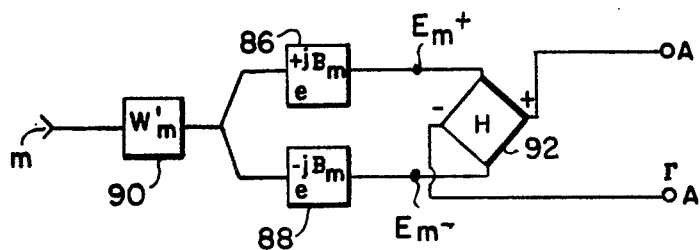
FIGS. 10a – 10d illustrates the development of an auxiliary sub-array for use in the case of simultaneous platform motion and antenna scanning.

As in all conventional arrays, each element of the array is given the weight necessary to form a beam in a desired direction. Therefore, for a weighting factor, W'm, (shown at 90) for a main sub-array element, the contribution of the $m^{th}$ element of the auxiliary sub-arrays, as shown in FIG. 10a is $$E_m^+ = W_m' e^{+\alpha\beta m}$$

$$E_m^- = W_m' e^{-\alpha\beta m}$$

Forming the sum and difference of the auxiliary sub-array signals (as represented by the $m^{th}$ element) at 92 results in a sum signal of $$A = 2W_m' \cos\beta m$$

and a difference signal of $$\Gamma A = 2 \alpha W_m' \sin \beta_m$$

Figure 10B:
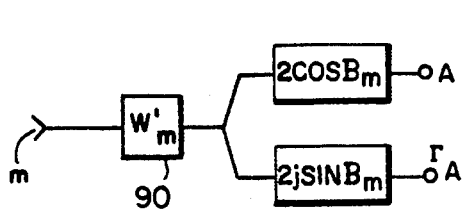
Figure 10C:
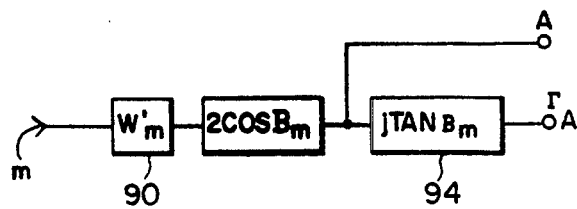
Figure 10D:
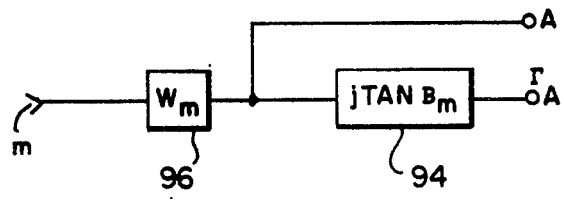

But as shown in FIGS. 10b and 10c this is equivalent to $$\Gamma A = W_m' (2 \cos \beta_m) (\alpha\tan\beta m)$$

However, the choice of Wm' was arbitrary. Therefore, a set of weights, Wm, can be freely selected to satisfy the requirements for the sum signal A as a main sub-array output for the platform-motion scheme. Consequently the correction signal $\Gamma A$ can be generated for a main element weighting of Wm, by inserting an additional weight of $\alpha \tan BM$ at each element. This is shown by weighting means 94 and 96 in FIG. 10d.

Figure 11:
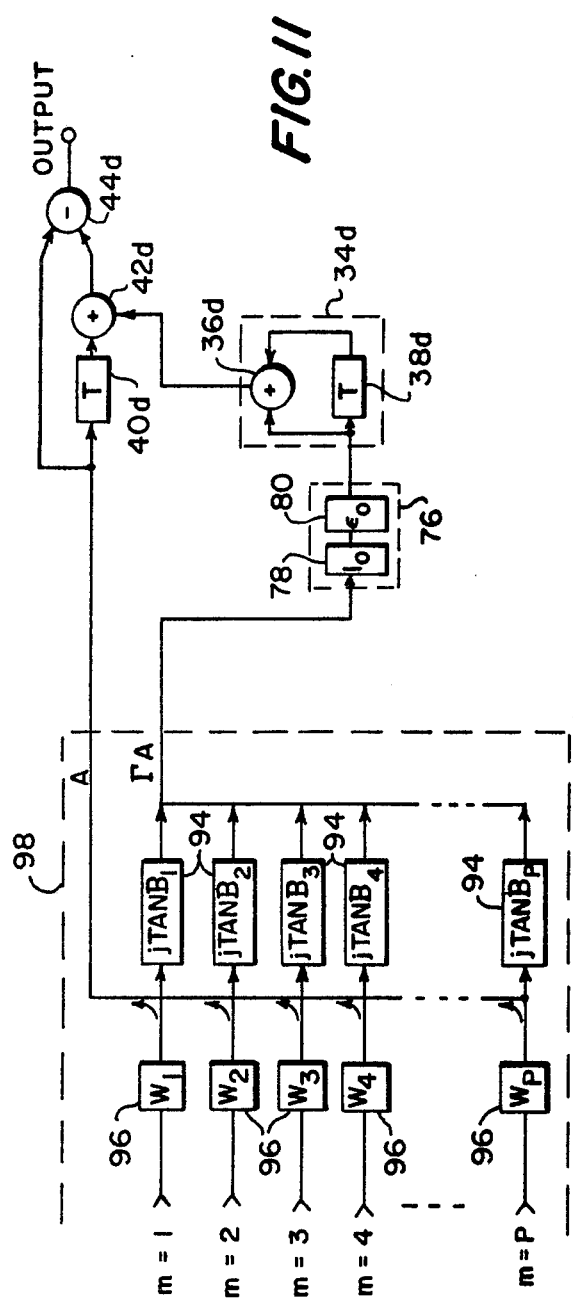
FIG. 11 is a block diagram of a two-pulse canceller with compensation for antenna scanning which uses an auxiliary sub-array.

FIG. 11 shows a two-pulse canceller with scanning-motion compensation in which the auxiliary sub-array $\Gamma A$ is formed by modifying each element of the main sub-array A by the factor of $\alpha \tan Bm$ as explained in connection with FIG. 10. The antenna 98 has P receiving elements with each element having a weighting factor, Wm, as shown at 96. The weighted signals from 96 are summed to form the signals from main sub-array A. Each weighted signal from 96 is also modified at 94 by $\alpha \tan Bm$ and the outputs from 94 are summed to form the signals from auxiliary sub-array $\Gamma A$ . The signals from the main sub-array A and the signals from the auxiliary sub-array $\Gamma A$ are related to each other in the same manner as the $\Sigma$-channel signals and the $\Delta$-channel signals are related in the two-pulse canceller with antenna-scanning compensation of FIG. 6. Consequently, the signals from the auxiliary sub-array $\Gamma A$ may be used to compensate the signals from the main sub-array A for scanning motion. Clutter may then be cancelled in a manner identical with that shown in FIG. 6.

Figure 12:
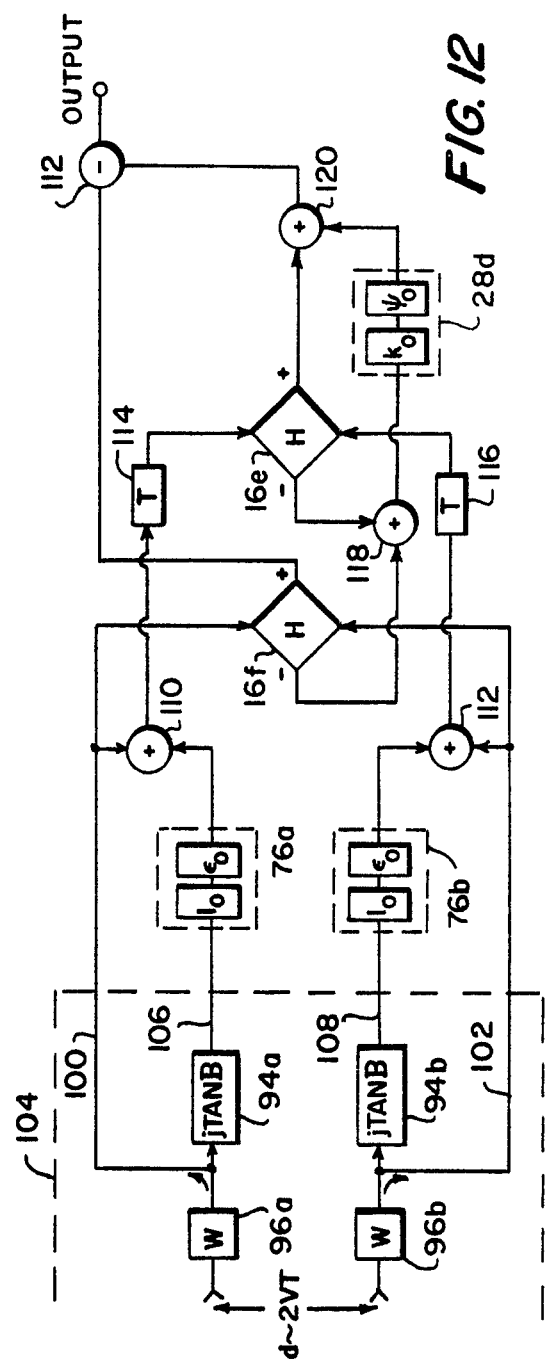
FIG. 12 is a block diagram of a two-pulse canceller with compensation for simultaneous platform motion and antenna scanning.

FIG. 12 illustrates a two-pulse canceller with simultaneous platform and scanning-motion compensation according to the techniques of the present invention. The canceller of FIG. 12 combines the platform-motion compensation technique of FIG. 1 with the scanning-motion compensation technique of FIG. 11.

Two main sub-arrays 100 and 102 of antenna 104 are formed in the manner of sub-arrays 12 and 14 of FIG. 1. Two auxiliary sub-arrays 106 and 108 are formed from the same elements as the main sub-arrays 100 and 102, respectively, but having an element weighting which is modified by $\alpha \tan Bm$, element for element, as discussed hereinbefore in connection with FIG. 10. The RF signals from each sub-array are converted to IF signals by conventional mixing techniques (not shown in FIG. 12 for simplicity) and the signals from the auxiliary sub-arrays 106 and 108 are adjusted in phase and amplitude in SMC optimization means, 76a and 76b, respectively.

The adjusted signal from each auxiliary sub-array 106 and 108 is added to the signal from the corresponding main sub-array 100, 102 in an addition circuit 110, 112 to form a main sub-array signal which has been compensated for antenna scanning. The outputs of the addition circuits 110 and 112 are delayed for an interpulse period at 114 and 116, respectively, and are applied to a hybrid amplifier 16e which forms the sum and difference of the two delayed, compensated signals. The signals from the main sub-arrays 100 and 102 are also applied directly to a hybrid amplifier 16f which forms their sum and difference.

The difference signal from 16e is added to the difference signal from 16f in an addition circuit 118 and the output of addition circuit 118, after adjustment in phase and amplitude in a PMC optimization means 28d, is combined with the sum output of hybrid amplifier 16e in an addition circuit 120. The output of addition circuit 120 is a signal that is synchronized in time and phase with the sum output of hybrid amplifier 16f. Clutter may be cancelled by subtracting the two synchronized signals at 122.

It should be apparent that the simultaneous scanning and platform-motion compensation technique of the present invention is applicable to higher-order cancellers. N overlapping main sub-arrays may be formed (where N is the number of pulses to be cancelled) and an auxiliary sub-array formed for each main sub-array. The main sub-array and the auxiliary sub-arrays are combined in the manner of FIG. 12 to provide N-1 cancelled signals such as shown at 122. Each two consecutive of the N-1 cancelled signals are applied as inputs to a two-pulse canceller with platform-motion compensation. This two-pulse cancellation process is repeated until a single signal is available at the system output.

As previously mentioned in connection with the discussion of the technique for platform-motion compensation only, space limitations can cause an unacceptable penalty in antenna gain if N main sub-arrays and N auxiliary sub-arrays are used to form N-pulse canceller. Consequently an alternative technique, combining the N-pulse platform-motion compensation technique of FIG. 5 and the simultaneous platform and scanning-motion compensation technique of FIG. 12, is presented.

Referring now to FIG. 13, there is shown a block diagram of a system which provides simultaneous platform-and scanning-motion compensation over N pulses. Antenna 104a includes two main sub-arrays 100a and 102a and two auxiliary sub-arrays 106a and 108a, and is identical with the antenna 104 of FIG. 13. After the phase and amplitude of the auxiliary sub-arrays are adjusted in SMC optimization means 76c and 76d, the output of each sub-array is fed to a correction signal generator 124 which produces a correction signal $C_{ps}$. The outputs of the main sub-arrays 100a and 102a are also fed to an addition circuit 126 which produces the sum of the two main sub-array signals.

The object of the correction signal generator 124 is to provide a signal $C_{ps}$ which may be added at 127 to a delayed output (delayed at 129) from addition circuit 126 to bring the latter signal into time and phase synchronization with an undelayed output from the addition circuit 126. This correction signal $C_{ps}$ may be fed to a synchronizing means 62b which is also coupled to the delayed output of the addition circuit 126. The synchronizing means 62b combines its two inputs to produce a series of signals that are synchronized in time and phase with the output of the addition circuit 126.

FIG. 14 shows the correction signal generator 124 in detail. Addition circuits 128 and 130 combine the signals from the main sub-arrays with the adjusted signals from the corresponding auxiliary sub-arrays to provide compensated main sub-array signals. These compensated main sub-array signals, after being delayed for an interpulse period at 132 and 134, are fed to a subtraction circuit 136. The signals from the main sub-arrays are fed directly to a subtraction circuit 138. (The outputs of subtraction circuits 136 and 138 correspond to the difference outputs hybrid amplifiers 16e and 16f, in FIG. 12, respectively.) The outputs of the subtraction circuits 136 and 138 are then added at 140 and adjusted in PMC optimization means 28e to form the platform-motion component of the total compensation signal.

The adjusted signals from the auxiliary sub-arrays are combined in an addition circuit 142. (In the system of FIG. 12, this addition occurred in the sum output of hybrid amplifier 16e.) The output of addition circuit 142 is delayed for an interpulse period at 144, to form the scanning-motion component of the total compensation signal. The two components of the motion compensation are combined in addition circuit 146. The output of addition circuit 146 is the correction signal $C_{ps}$ which may be applied to the synchronizing means 62b to bring the preceding outputs of addition circuit 126 (in FIG. 13) into time and phase synchronism with the present output.

The synchronized outputs of synchronizing means 62b may be now used as inputs for coherent processing systems or may be used as inputs to clutter cancellers, as has been previously described in connection with the platform-motion compensation system of FIG. 5.

It can be seen that the compensation for the effects of simultaneous platform motion and antenna scanning as shown by the present invention may provide many synchronized signals for multiple-pulse MTI processing techniques or compensation at each state of cancellation in clutter cancellers. Obviously, many modifications and variations of the present invention are possible in light of the above teachings. It is therefore to be understood that within the scope of the appended claims, the invention may be practiced otherwise than as described.

What is claimed and desired to be secured by Letters Patent of the United States is

1. In a radar system of the type wherein search pulses are periodically radiated in a directional beam, a system for compensating the backscattered signals for the effects of relative motion between the radar and the backscatterer comprising:

an array antenna for receiving the backscattered signals, said antenna including first and second main sub-arrays for forming first and second similarly-shaped receive beams, the distance between the lines of center of said first and second receive beams at the antenna being related to a predetermined linear velocity of the radar and to the interpulse period, the lines of center of said first and second receive beams being parallel, said antenna including first and second auxiliary sub-arrays for forming third and fourth similarly shaped receive beams, the angle between the lines of center of said first receive beam and said third receive beam being related to the angular velocity of the radar and to the interpulse period, the lines of center of said first receive beam and said third receive beam intersecting at the antenna, the angle between the lines of center of said second receive beam and said fourth receive beam being related to the angular velocity of the radar and to the interpulse period, the lines of center of said second receive beam and said fourth receive beam intersecting at the antenna;

first scanning-motion-compensation optimization means coupled to receive the output of said first auxiliary sub-array for adjusting the signals from said sub-array in phase and amplitude;

second scanning-motion-compensation optimization means coupled to receive the output of said second auxiliary sub-array for adjusting the signals from said sub-array in phase and amplitude; and means for generating a delayed compensated signal that is synchronized in time and phase with the sum of the undelayed signals from said first and said second main sub-arrays, said means for generating receiving the outputs of said first main sub-array, said second main sub-array, said first scanning-motion-compensation optimization means, and said second scanning-motion-compensation optimization means as inputs, the output of said means for generating being said delayed, compensated signal.

2. The system as recited in claim 1 wherein said means for generating a delayed, compensated signal comprises;

a first addition circuit having a first input coupled to the output of said first main sub-array and a second input coupled to the output of said first scanning-motion-compensation optimization means;

a second addition circuit having a first input coupled to the output of said second main sub-array and a second input coupled to the output of said second scanning-motion-compensation optimization means;

a first delay circuit having the output of said first addition circuit as its input, said first delay circuit delaying its input signal for an interpulse period;

a second delay circuit having the output of said second addition circuit as its input, said second delay circuit delaying its input signal for an interpulse period;

first forming means coupled to said first and second delay circuits for forming sum and difference outputs of the signals received;

second forming means coupled to said first and second main sub-arrays for forming sum and difference outputs of the signals received;

a third addition circuit having a first input coupled to the difference output of said first forming means and a second input coupled to the difference output of said second forming means;

platform-motion-compensation optimization means coupled to receive the output of said third addition circuit for adjusting the signals from said third addition circuit in phase and amplitude; and a fourth addition circuit having a first input coupled to the sum output of said first forming means and a second input coupled to the output of said platform-motion-compensation optimization means, the output of said fourth addition circuit being said delayed compensated signal that is synchronized in time and phase with the sum of the undelayed signals from said first and second main sub-arrays.

3. The system as recited in claim 2 further comprising:
a subtraction circuit having a first input coupled to the output of said fourth addition circuit and a second input coupled to the sum output of said second forming means, the output of said subtraction circuit being a signal in which clutter has been cancelled.

4. The system as recited in claim 1 wherein said means for generating a delayed, compensated signal comprises:
a first addition circuit having a first input coupled to the output of said first main sub-array and a second input coupled to the output of said second main sub-array;
a first delay circuit having the output of said first addition circuit as an input, said first delay circuit delaying its input signal for an interpulse period;
correction-signal generator means for providing a correction signal that may be added to the output of said first delay circuit to form a signal that is synchronized in time and phase with the output of said first addition circuit, said correction-signal generator means receiving as inputs the outputs of said first main sub-array, said second main sub-array, said first scanning-motion-compensation optimization means, and said second scanning-motion-compensation optimization means; and
a second addition circuit having a first input coupled to the output of said first delay circuit and a second input coupled to the output of said correction-signal generator means, the output of said second addition circuit being a signal that is synchronized in time and phase with the sum of the undelayed signals from said first and second main sub-arrays.

5. The system as recited in claim 4 wherein said correction signal generator means comprises:
a third addition circuit having a first input coupled to the output of said first main sub-array and a second input coupled to the output of said first scanning-motion-compensation optimization means;
a fourth addition circuit having a first input coupled to the output of said second main sub-array and a second input coupled to the output of said second scanning-motion-compensation optimization means;

a second delay circuit having the output of said third addition circuit as its input, said second delay circuit delaying an input signal for an interpulse period;
a third delay circuit having the output of said fourth addition circuit as its input, said third delay circuit delaying an input signal for an interpulse period;
a fifth addition circuit having a first input coupled to the output of said first scanning-motion-compensation optimization means and a second input coupled to the output of said second scanning-motion-compensation optimization means;
a first subtraction circuit having a first input coupled to the output of said first main sub-array and a second input coupled to the output of said second main sub-array;
a second subtraction circuit having a first input coupled to the output of said second delay circuit and a second input coupled to the output of said third delay circuit;
a sixth addition circuit having a first input coupled to the output of said first subtraction circuit and a second input coupled to the output of said second subtraction circuit;
platform-motion-compensation optimization means coupled to receive the output of said sixth addition circuit for adjusting the signals from said sixth addition circuit in phase and amplitude;
a fourth delay circuit having the output of said fifth addition circuit as its input, said fourth delay circuit delaying an input signal for an interpulse period; and
a seventh addition circuit having a first input coupled to the output of said platform-motion-compensation optimization means and a second input coupled to the output of said fourth delay circuit, the output of said seventh addition circuit being said correction signal.

6. The system as recited in claim 4, further comprising a synchronizing means which comprises:
a plurality of delay circuits, each of said plurality of delay circuits delaying an input signal for an interpulse period, the first of said plurality of delay circuits having its input coupled to the output of said second addition circuit; and
a plurality of addition circuits, each of said plurality of addition circuits having a first input coupled to the output of one of said plurality of delay circuits and a second input coupled to the output of said correction-signal generator means,
said plurality of addition circuits being coupled to said plurality of delay circuits so that an input signal to the first of said plurality of delay circuits is repetitively delayed for an interpulse period and repetitively combined with the output of said correction-signal generator means to form a series of signals which are synchronized in time and phase with the output of said first addition circuit.

* * * * *